March 12, 1957 W. V. BOWEN 2,784,451
FIBER FORMING APPARATUS
Filed Sept. 30, 1954 4 Sheets-Sheet 1
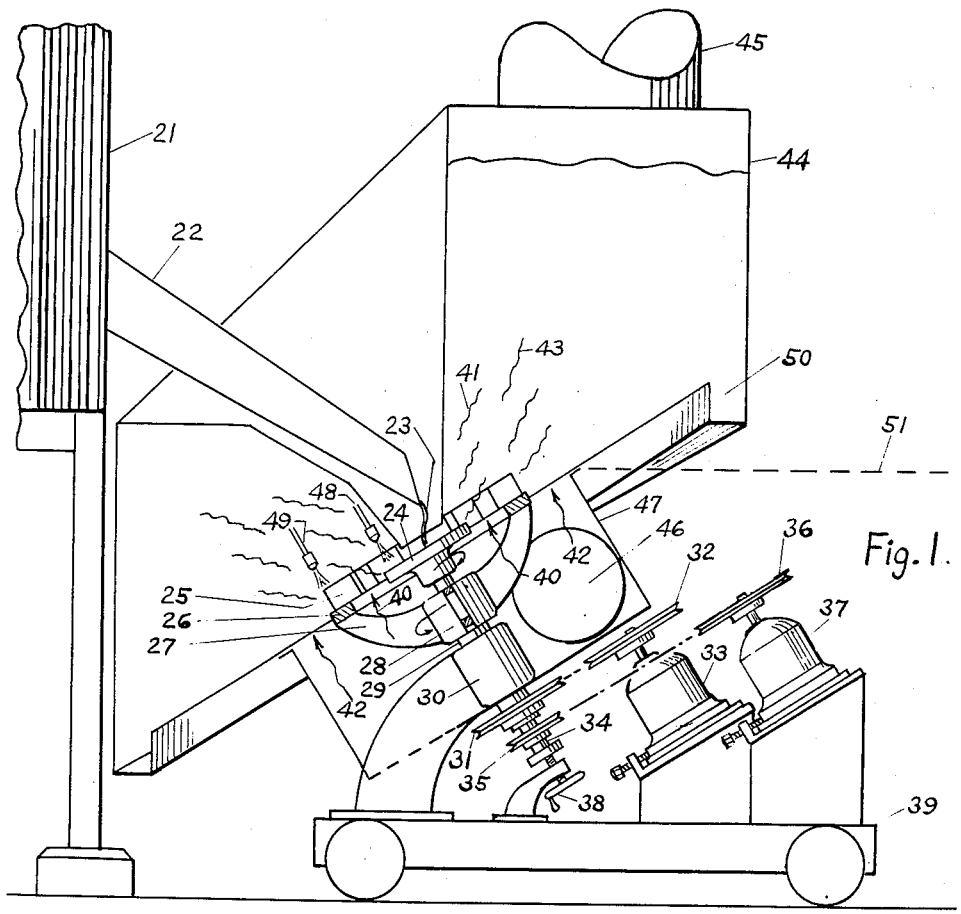
Fig. 1.
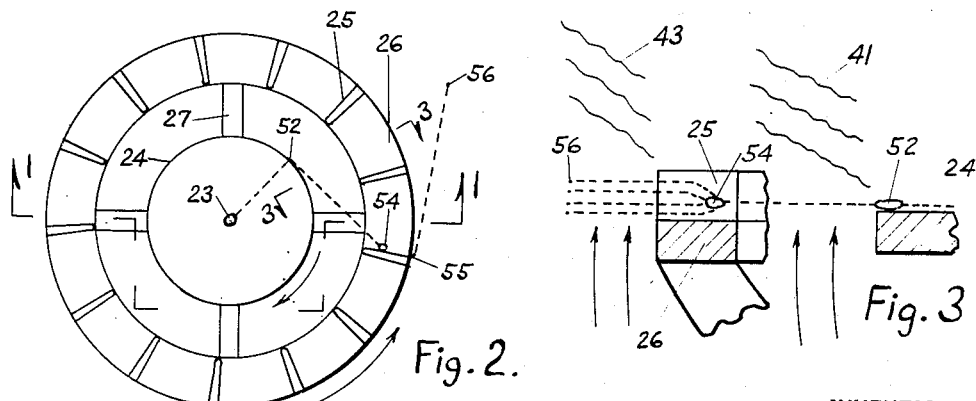
Fig. 2.
Fig. 3
INVENTOR.
William V. Bowen
BY
Watson, Cole, Grindle + Watson
ATTORNEYS

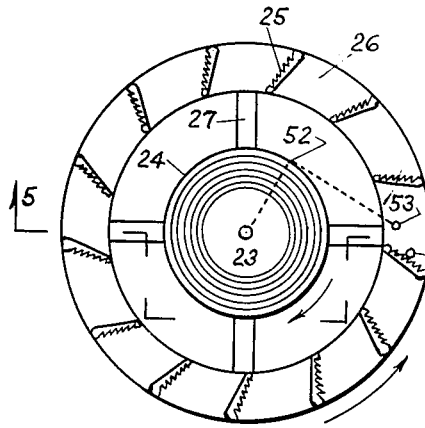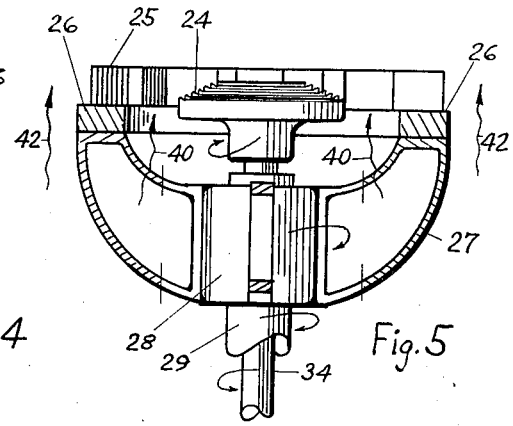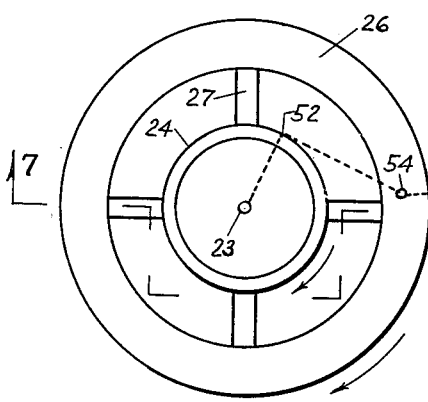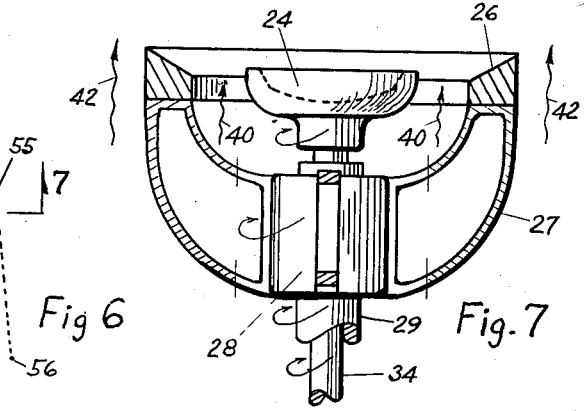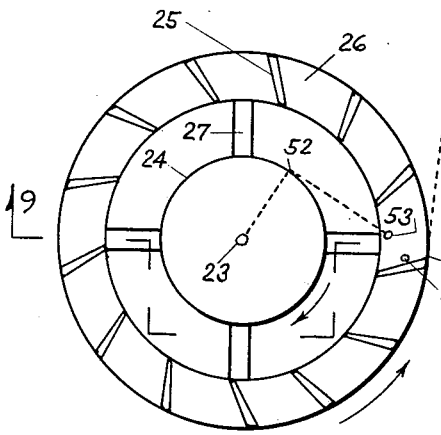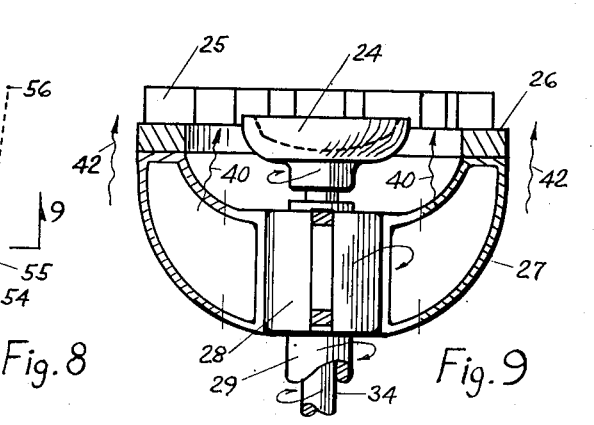
INVENTOR.
William V. Bowen March 12, 1957 W. V. BOWEN 2,784,451
FIBER FORMING APPARATUS
Filed Sept. 30, 1954 4 Sheets-Sheet 3

INVENTOR.
William V. Bowen

INVENTOR.
William V. Bowen

United States Patent Office 2,784,451
Patented Mar. 12, 1957

2,784,451

FIBER FORMING APPARATUS

William V. Bowen, Baltimore, Md.

Application September 30, 1954, Serial No. 459,436

10 Claims. (Cl. 18—2.6)

My invention relates to the manufacture of fibrous products from materials which may assume a viscous, fluid, semi-fluid, or molten condition, wherein the material is caused to impinge upon rapidly rotating surfaces to be converted into a multiplicity of fine fibers. This invention provides the means to manufacture a fibrous product from molten rock, slag, glass, sand, coal ash, mixtures thereof and thereto and like raw materials and from thermo-plastic materials such as resins, vinyls, copolymers, styrene, acetates, butyrates, polyethylene and acrylics, and other materials responsive to treatment offered by this invention.

Heretofore, mineral wool and glass wool have been made in a number of ways. As of this date, practically all of the tonnage of mineral wool and glass wool has been and is being manufactured by the conventional method of disintegrating a molten stream of material into fibers by a blast of steam at approximately 100 p. s. i. g. pressure. The product settles in a large blow room onto a conveyor surface which discharges the wool for further processing into shredded wool, nodulated wool, batts, blankets, felts, boards or acoustical tile. Present commercial methods result in the production of slag wool and rock wool containing approximately 50 percent loose wool fiber and 50 percent shot, not a very efficient process. In addition, approximately 1½ pounds of steam are used for each 1 pound of slag blown, requiring substantial steam generation and fuel consumption. For a number of years it has been proposed to use spinning discs of various designs driven at high speed to hurl the molten material into space at high velocity and thus convert it into fine fibers. The very few installations where production has been attempted by the spinning process have been handicapped by very low unit production and high shot loss. The instant invention provides for an improved apparatus of the spinning type free of prior objections. This invention incorporates improved designs of spinning discs and a novel combination of spinning discs wherein the ufiberized molten material from a first stage or primary spinning disc is intercepted by a second stage or secondary spinning disc whereon it is again accelerated to a high velocity and projected into space to complete its fiberization. Additional discs may be used to permit the process to continue similarly. The principal objects of this invention are the provision of an improved apparatus and method employed in conjunction with the spinning operation to provide vast improvement in productive capacity, greatly reduced manufacturing cost of the product, and improved fibers relatively free of waste shot. These and other objects and advantages of this invention will be more fully understood when reference is made to the more detailed description thereof which follows, and to the accompanying drawings, in which:

Fig. 1 is a diagrammatic elevation illustrating the general arrangement of the source of molten material and the fiberizing apparatus. The rotors are here shown partly in elevation and partly in section taken along line 1—1 on Fig. 2;

Fig. 2 is a plan view of the rotors shown in Fig. 1;

Fig. 3 is a sectional elevation taken along line 3—3 on Fig. 2;

Fig. 4 is a plan view of a modified apparatus;

Fig. 5 is an elevation partly in section of the rotors shown in Fig. 4 along line 5—5;

Fig. 6 is a plan view of another modification of the apparatus;

Fig. 7 is an elevation partly in section of the rotors shown in Fig. 6 along line 7—7;

Fig. 8 is a plan view of another modification of the apparatus;

Fig. 9 is an elevation partly in section of the rotors shown in Fig. 8 along line 9—9;

Figure 10:
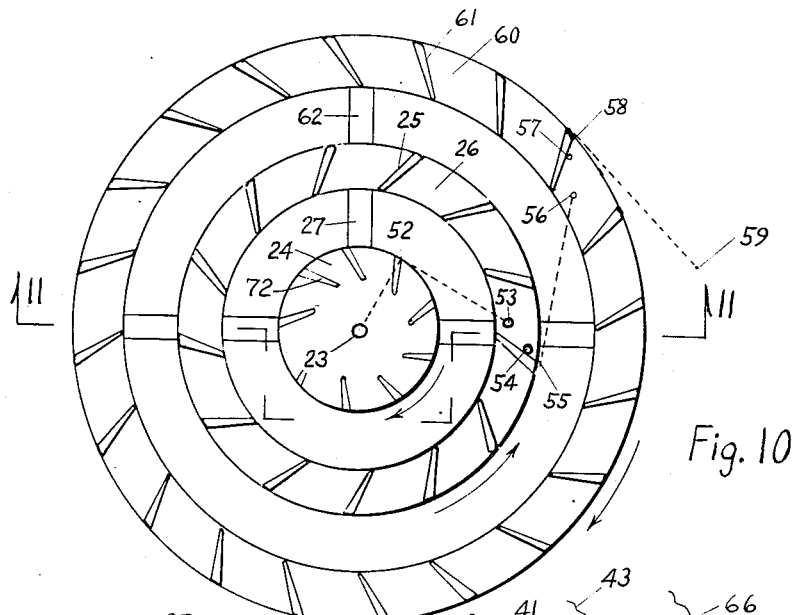
Fig. 10 is a plan view of another modification of the apparatus.
Figure 11:
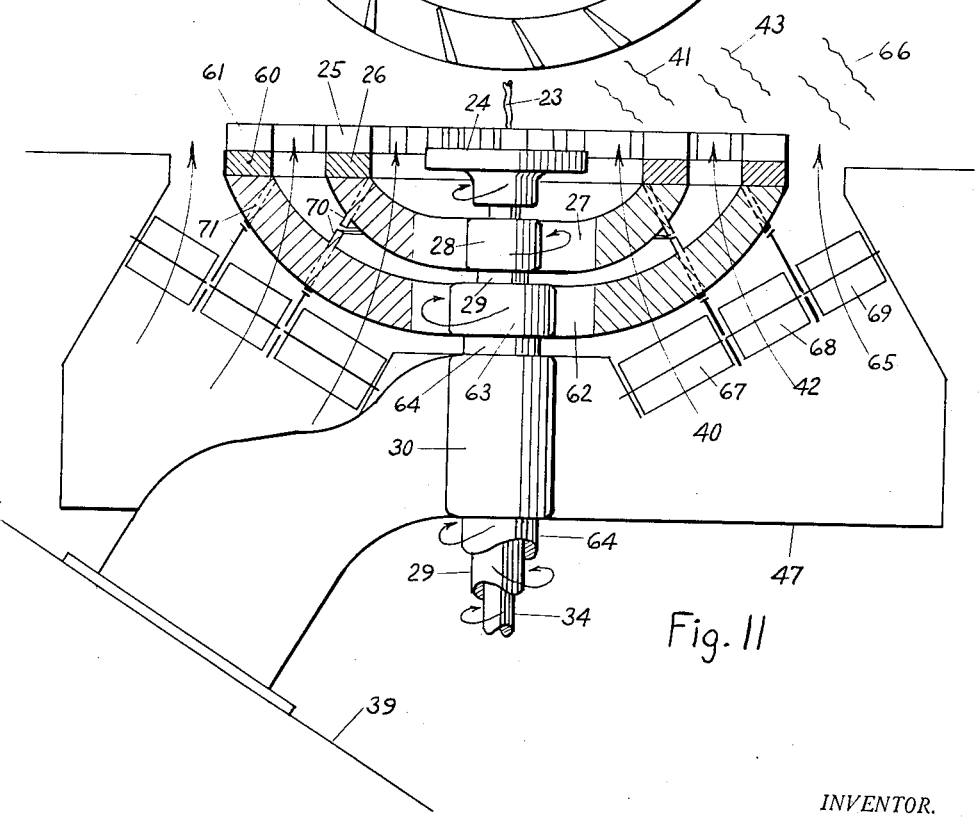
Fig. 11 is an elevation partly in section of the rotors shown in Fig. 10 along line 11—11.
Figure 12:
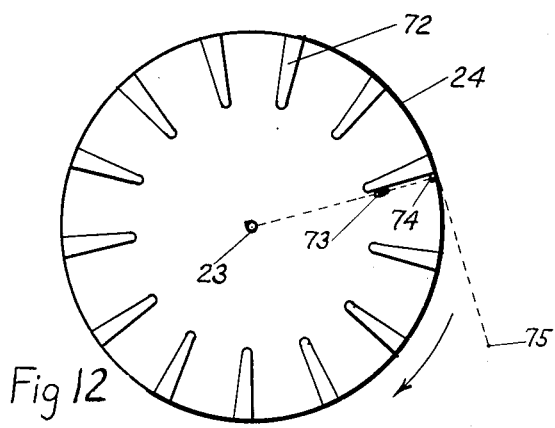
Fig. 12 is a plan view of an arrangement of a primary spinning rotor.
Figure 13:
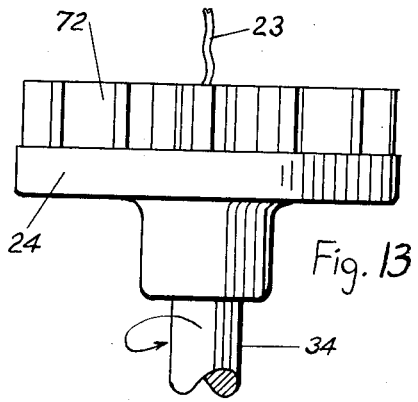
Fig. 13 is an elevation of the rotor shown in Fig. 12.
Figure 14:
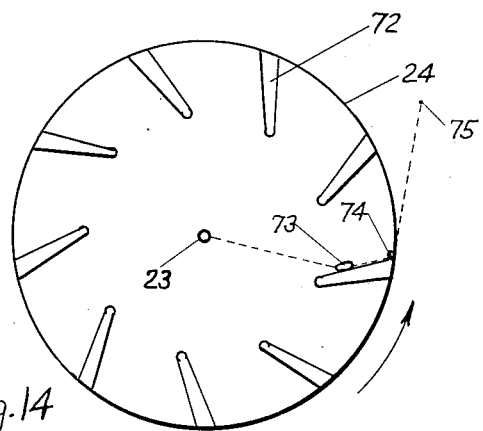
Fig. 14 is a plan view of a modified primary spinning rotor.
Figure 15:
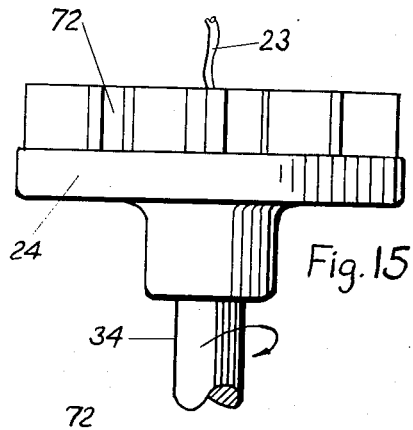
Fig. 15 is an elevation of the rotor shown in Fig. 14.
Figure 16:
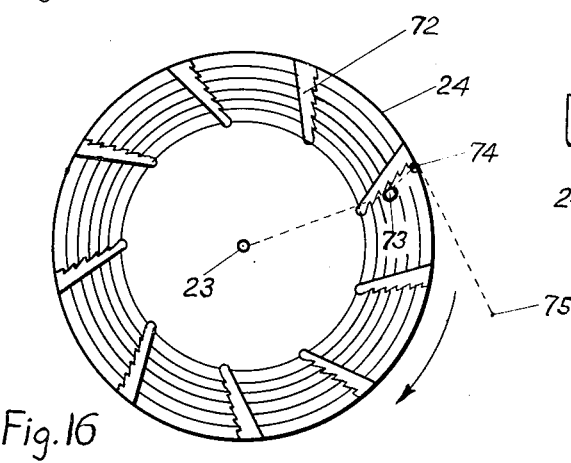
Fig. 16 is a plan view of another modification of a primary spinning rotor.
Figure 17:
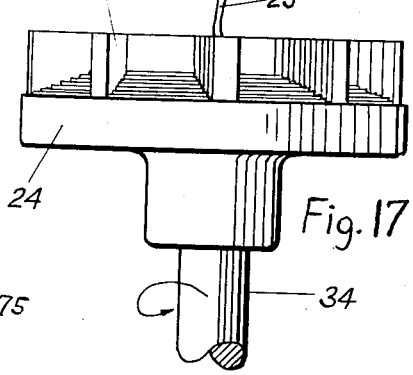
Fig. 17 is a plan view of the rotor shown in Fig. 16.

Referring now to the drawings and to Fig. 1, the melting furnace is indicated by reference numeral 21. The furnace illustrated is of the cupola type, but it will be understood that any suitable melting furnace such as a reverberatory furnace or glass tank may be employed if desired. A forehearth as a melt receptacle for slag temperature and/or flow control may be used between the furnace and the spinning equipment if desired. The furnace includes a discharge trough 22 by which a stream of molten material 23 is drawn from the furnace and arranged to discharge onto primary rotor 24 which may be positioned horizontally or at an angle of inclination as ilustrated. Rotor 24 is driven at high speed by shaft 34, V-belt sheaves 35 and 36 and variable speed motor 37. Rotor 24 is heated by torch 48, and is of material suitable to withstand a high operating temperature and to resist the erosion of molten slag. Rotor 24 here shown is a flat disc but it may have projections as indicated in later figures. Molten stream 23 falls on rotor 24, is rapidly accelerated in speed and is hurled into space at high velocity producing fibers 41 which are promptly lifted out of the conversion zone by air flow 40. Residual molten pellets having been reduced to a velocity that precludes further self stripping into fibers together with all other slag inadvertently thrown from rotor 24 in larger globules is intercepted by projection 25 on secondary rotor 26. Rotor 26 is an annular disc-like rotor positioned to operate concentric with, and substantially in the same plane of rotation as rotor 24. Rotor 26 is connected by spokes 27 to hub 28 to shaft 29 which are all driven at high speed by V-belt sheaves 31 and 32 and variable speed motor 33. Rotor 26 and projections 25 are of material of the same character as rotor 24 and are heated by torch 49. The molten slag intercepted by projections 25 is rapidly accelerated in speed and is projected into space at high velocity producing fibers 43 which are promptly lifted out of the conversion zone by air flow 42. Any residual solidified pellets are caught in trough 50 as waste shot. The fibers produced are usually 4 to 7 microns in diameter and are readily lifted out of the zone of conversion by air flows 40 and 42, whereas the globules of molten slag are relatively undiverted from their path of flight by the air flow. Shaft 34 operates within hollow shaft 29 with suitable bearings. Main bearing 30 serves shaft 29 and supports the complete rotating assembly. Adjusting closed herein but is to be accorded the full scope of the claims so as to embrace any and all equivalent devices.

Having described our invention, what we claim as new and desire to secure by Letters Patent is:

1. A mechanical action for artificial limb joints comprising a relatively stationary member and a ratchet segment rotatably mounted on the member, a lever rotatably mounted on the member with the rotational axis adjacent to the circumference of the ratchet segment, a locking bar on said lever having opposite curved faces positioned generally perpendicular to the radius from the rotational axis of the lever, said segment having a series of spaced generally radially extending bar receiving notches with faces complementary to the respective faces of the bar when in bar receiving position, said rotational axis of the lever being at a point adjacent a line tangent to an arc about the axis of said segment struck through the centers of the faces of said notch.

2. A mechanical action for artificial limb joints comprising a relatively stationary member and a ratchet segment rotatably mounted on the member on the axis of rotation of the joint, a lever rotatably mounted on the member with the rotational axis adjacent to and exterior of the circumference of the ratchet segment, a locking bar on said lever having opposite faces positioned generally perpendicular to the radius from the rotational axis of the lever and the faces, said segment being subject to a rotative load and having a series of spaced generally radially extending bar receiving notches with faces complementary to the respective faces of the bar when in bar receiving position, said rotational axis of the lever being within an angular distance of a line tangent to an arc about the axis of said segment struck through the centers of the faces of said notch such that the component of the force resulting from application of a rotative load tending to disengage the bar from the notch is less than the frictional force on the respective contacting faces.

3. A mechanical action for artificial limb joints comprising a relatively stationary member and a ratchet segment rotatably mounted on the member on the axis of rotation of the joint, a lever rotatably mounted on the member with the rotational axis adjacent to and exterior of the circumference of the ratchet segment, a locking bar on said lever having opposite arcuate faces positioned generally perpendicular to the radius from the rotational axis of the lever and the faces, said segment having a series of spaced generally radially extending bar receiving notches with arcuate faces complementary to the respective faces of the bar when at bar receiving position, said rotational axis of the lever being within an angular distance of five degrees inside of a line tangent to an arc about the axis of said segment struck through the centers of the faces of said notch.

4. A mechanical action for artificial limb joints comprising a relatively stationary member and a ratchet segment rotatably mounted on the member on the axis of rotation of the joint, a lever rotatably mounted on the member with the rotational axis adjacent to and exterior of the circumference of the ratchet segment, a locking bar on said lever having opposite arcuate faces of radius of curvature determined by the distance between the rotational axis of the lever and the respective face, said segment having a series of spaced generally radially extending bar receiving notches with arcuate faces complementary to the respective faces of the bar, said rotational axis of the lever being at a point within an angular distance of 15 degrees on either side of a line tangent to an arc centered at the axis of said segment and through the centers of the faces of a notch in bar engaging position, the faces of said notches having positions wherein said last faces are in engagement substantially throughout their areas with the respective faces of the bar when in bar engaging position.

5. A mechanical action for artificial limb joints comprising a pair of members wherein one member is adapted for attachment to a natural limb, parallel plates on one of the members, the other of said members comprising a tubular sleeve rotatably mounted on said plates providing thereby an articulating joint for said action, a ratchet segment fixed on said sleeve having a series of spaced generally radially extending notches, a lever pivotally mounted at a center of rotation on said one member, a locking bar fixed transversely on the lever, and an alternator connected between the lever and one of said members adapted to releasably hold said bar out of notch engagement position, said bar having opposite notch contacting faces curved in the same general direction and said notches having opposite curved bar engaging faces complementary to and adapted to engage the respective faces of the bar when in bar engaging position.

6. A mechanical action for artificial limb joints comprising a relatively stationary member adapted for attachment to a natural limb, parallel plates on said member and a tubular sleeve rotatably mounted on said plates providing thereby an articulating joint for said action, a ratchet segment fixed on said sleeve having a series of spaced generally radially extending notches, a lever pivotally mounted at a center of rotation on said member, a locking bar fixed transversely on the lever, a spring on said member normally urging said bar toward a notch engagement position, and an alternator connected between said member and the lever adapted to releasably hold said bar out of notch engagement position, said bar having opposite notch contacting faces of arcuate form and of radius determined by the distance between the respective face and said center of rotation of the lever, said notches having opposite bar engaging faces of arcuate form complementary to and adapted to engage the respective faces of the bar when in bar engaging position.

7. A ratchet resistant mechanical action for artificial limb joints comprising a base, a ratchet segment rotatably mounted on the base and a locking bar having a pivotal mounting on said base, said locking bar having opposite segment-engaging faces curved in the same general direction about the axis of said pivotal mounting, said segment having a series of peripheral bar receiving notches with opposite faces respectively complementary to the faces on said bar.

References Cited in the file of this patent

UNITED STATES PATENTS 2,637,042     Threewit _____ May 5, 1953

FOREIGN PATENTS 303,664     Germany _____ Feb. 11, 1918 the heat and erosion of said molten stream positioned to receive said stream onto its upper surface, means for rotating said rotor at high speed, a secondary annular rotor of similar character concentric with said primary rotor and spaced therefrom and positioned to receive molten material discharged from said primary rotor, means to rotate said secondary rotor at high speed, means to heat each of said rotors, and means to provide a current of air to flow upwardly and axially of the rotation of the rotors.

2. In an apparatus for use in the manufacture of mineral wool including means for discharging a raw material in a molten stream, a primary rotor constructed to endure the heat and erosion of said molten stream positioned to receive said stream onto its upper surface, means for rotating said rotor at high speed, a secondary annular rotor of similar character concentric with said primary rotor and spaced therefrom and positioned to receive molten material discharged from said primary rotor, means to rotate said secondary rotor at high speed in the opposite direction to the rotation of said primary rotor, means to heat each of said rotors, and means to provide a current of air to flow upwardly and axially of the rotation of the rotors.

3. In an apparatus for use in the manufacture of mineral wool including means for discharging a raw material in a molten stream, a primary rotor constructed to endure the heat and erosion of said molten stream positioned to receive said stream onto its upper surface, means for rotating said rotor at high speed, a secondary annular rotor of similar character concentric with said primary rotor and spaced therefrom and positioned to receive molten material discharged from said primary rotor, means to rotate said secondary rotor at high speed in the same direction as the rotation of said primary rotor, means to heat each of said rotors, and means to provide a current of air to flow upwardly and axially of the rotation of the rotors.

4. In a mineral wool apparatus including means for discharging a molten material stream, a primary rotor constructed to withstand the heat and erosion of said molten stream positioned to receive said stream onto its upper surface, means for rotating said rotor at high speed, a secondary annular rotor of similar character concentric with said primary rotor and spaced therefrom and positioned to receive molten material discharged from said primary rotor, means to rotate said secondary rotor at high speed, a tertiary annular rotor of similar character concentric with said secondary rotor and spaced therefrom and positioned to receive molten material discharged from said secondary rotor, means to drive said tertiary rotor at high speed, means for heating each of said rotors, and means for a flow of air to pass upwardly and axially of the rotation of the rotors.

5. In an apparatus for use in the manufacture of mineral wool including means for discharging a raw material in a molten stream, a primary rotor constructed to withstand the heat and erosion of the molten stream positioned to receive said stream onto its upper surface, means for rotating said rotor at high speed, a secondary annular rotor of similar character, concentric with said primary rotor and with an upper surface sloped upwardly and outwardly and spaced therefrom and positioned to receive molten material discharged from said primary rotor, means to rotate said secondary rotor at high speed, means to heat each of said rotors, and means for a current of air to flow upwardly and axially of the rotation of the rotors.

6. In an apparatus for forming mineral wool from fusible solids, the combination with a furnace including means to discharge a molten stream to a primary rotor constructed to withstand the heat and erosion of said stream and positioned to receive said stream onto its upper surface, means for driving said rotor at high speed, a secondary annular rotor, formed of similar material, having projections arranged thereon substantially radial and upright and spaced apart peripherally, said secondary rotor being concentric to said primary rotor, spaced therefrom, and positioned to receive molten material discharged from said first rotor, means to drive said secondary rotor at high speed, means to heat each of said rotors, and means to provide a current of air to flow upwardly and axially of the rotation of the rotors.

7. In a machine for fiberizing molten material, including a furnace and means for discharging a molten stream, a primary rotor constructed to withstand the heat and erosion of the molten stream, positioned to receive said stream onto its upper surface, means for driving said rotor at high speed, a secondary annular rotor having projections arranged thereon substantially upright and spaced apart peripherally with advancing surface substantially flat and installed angular to the radii with the peripheral vertical edge trailing the inner vertical edge, said secondary rotor being of similar character to said primary rotor, concentric thereto, spaced therefrom and positioned to receive the molten material discharged from said primary rotor, means to drive said secondary rotor at high speed, means to heat each of said rotors, and means to provide a flow of air to pass upwardly and axially of the rotation of the rotors.

8. In a machine for fiberizing molten material, including a furnace and means for discharging a molten stream, a primary rotor constructed to withstand the heat and erosion of the molten stream, positioned to receive said stream onto its upper surface, means for driving said rotor at high speed, a secondary annular rotor having projections arranged thereon substantially upright and spaced apart peripherally with advancing surface grooved substantially at right angles to the plane of rotation and installed angular to the radii with the peripheral vertical edge trailing the inner vertical edge, said secondary rotor being of similar character to said primary rotor, concentric thereto, spaced therefrom and positioned to receive the molten material discharged from said primary rotor, means to drive said secondary rotor at high speed, means to heat each of said rotors, and means to provide a flow of air to pass upwardly and axially of the rotation of the rotors.

9. In a mineral wool apparatus including means for discharging a molten material stream, a primary rotor constructed to withstand the heat and erosion of the molten stream, positioned to receive said molten stream onto its upper surface, means for driving said rotor at high speed, a secondary annular rotor having projections arranged thereon substantially upright and spaced apart peripherally with advancing surface substantially flat and installed angular to the radii with the peripheral vertical edge leading the inner vertical edge, said secondary rotor and projections being of similar character to said primary rotor, concentric thereto, spaced therefrom and positioned to receive the molten material discharged from said primary rotor, means to drive said secondary rotor at high speed, means to heat each of said rotors, and means to provide a current of air to pass upwardly and axially of the rotation of the rotors.

10. A machine for use in the manufacture of mineral wool comprising a plurality of concentric rotors, means for revolving the rotors at high speed, means for discharging a molten stream of raw material onto the surface of the innermost rotor, the adjacent edges of said rotors being spaced apart and the rotors positioned so that molten material discharged from the surface of an inner